US011796413B2

(12) United States Patent
Gupta

(10) Patent No.: US 11,796,413 B2
(45) Date of Patent: Oct. 24, 2023

(54) COMMUNICATION DEVICE HAVING BAROMETRIC SENSOR CALIBRATION RESPONSIVE TO COMMUNICATION FINGERPRINT OF KNOWN LOCAL NETWORK NODES

(71) Applicant: MOTOROLA MOBILITY LLC, Wilmington, DE (US)

(72) Inventor: Ranjeet Gupta, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/669,108

(22) Filed: Feb. 10, 2022

(65) Prior Publication Data

US 2023/0251157 A1 Aug. 10, 2023

(51) Int. Cl.
*G01L 27/02* (2006.01)
*G01L 27/00* (2006.01)
*G01L 19/08* (2006.01)

(52) U.S. Cl.
CPC .......... *G01L 27/002* (2013.01); *G01L 19/083* (2013.01)

(58) Field of Classification Search
CPC ........... G01L 2019/0053; G01L 27/002; G01L 27/005; G01L 27/007; G01L 19/08; G01L 19/083
See application file for complete search history.

(56) References Cited

U.S. PATENT DOCUMENTS

| 2016/0245716 | A1* | 8/2016 | Gum | G01L 27/002 |
| 2018/0073951 | A1* | 3/2018 | Venkatraman | H04W 4/023 |
| 2021/0400427 | A1* | 12/2021 | Burowski | H04W 4/023 |
| 2023/0075008 | A1* | 3/2023 | Cooper | G01S 5/0252 |

OTHER PUBLICATIONS

Shen, Xingfa, et al., "BarFi Barometer-aided Wi-Fi Floor Location using Crowdsourcing", 2015 IEEE 12th International Conference on Mobile Ad Hoc and Sensor Systems, Oct. 2015.

\* cited by examiner

*Primary Examiner* — Son T Le
*Assistant Examiner* — Matthew W. Baca
(74) *Attorney, Agent, or Firm* — Isidore PLLC

(57) ABSTRACT

A communication device, method and computer program product enable reduced polling of a barometric sensor, which reduces power consumption and sensor calibration drift. A controller of a communication device determines at least one of received signal strength and direction of respective broadcast signals from local network node(s) positioned within a building to provide a local coverage area. The controller determines a location of the communication device in relation to the local network nodes in response to determining the received signal strength and/or the direction of the respective broadcast signals. The controller determines current altitude data related to a current barometer reading of the barometric sensor. The controller compares the current and the historical altitude data associated with past reading(s) at the location. In response to determining that a difference between the historical and the current altitude data is greater than a threshold distance, the controller calibrates the barometric sensor.

20 Claims, 8 Drawing Sheets

COMMUNICATION DEVICE HAVING BAROMETRIC SENSOR CALIBRATION RESPONSIVE TO COMMUNICATION FINGERPRINT OF KNOWN LOCAL NETWORK NODES

BACKGROUND

1. Technical Field

The present disclosure relates generally to portable communication devices, and more particularly to portable communication devices that include a barometric sensor.

2. Description of the Related Art

Portable communication devices may include a number of sensors such as accelerometers, ambient light sensors, global positioning system (GPS) sensor, compass, proximity sensor, gyroscope, etc. Some portable communication devices can include a barometric sensor that is used for determining local weather in response to an atmospheric pressure change. The barometric sensor can also be used for determining altitude. The portable communication device can determine the altitude in order to assist first responders in locating a person who makes an emergency call using the portable communication device. Altitude of the device can also be determined by use of GPS signals; However, while inside of a building, the portable communication device may not have access to GPS signals as an alternate source of altitude information.

A number of different technologies are used in design of barometric sensors, including: (i) piezoelectric; (ii) piezoresistive; (iii) strain gage; and (iv) capacitive. What each of these technologies have in common is calibration drift that occurs in response to frequent activations, the passage of time, and changes in the environment (e.g., temperature). Thus, the communication device is required to regularly recalibrate the barometric sensor to maintain accurate altitude data. When available, recalibration involves locating the communication device and communicating with a fixed location external source of accurate barometric data to use in calibrating the barometric sensor of the communication device. In an example, airports often include METeorological Aerodrome Reports (METARs) stations that include station location, station altitude and ambient barometric pressure data. Many locations however do not have an external source of accurate barometric data to enable recalibration. In addition, frequent recalibration of the barometric sensor consumes stored power, reducing available time between recharging of the communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
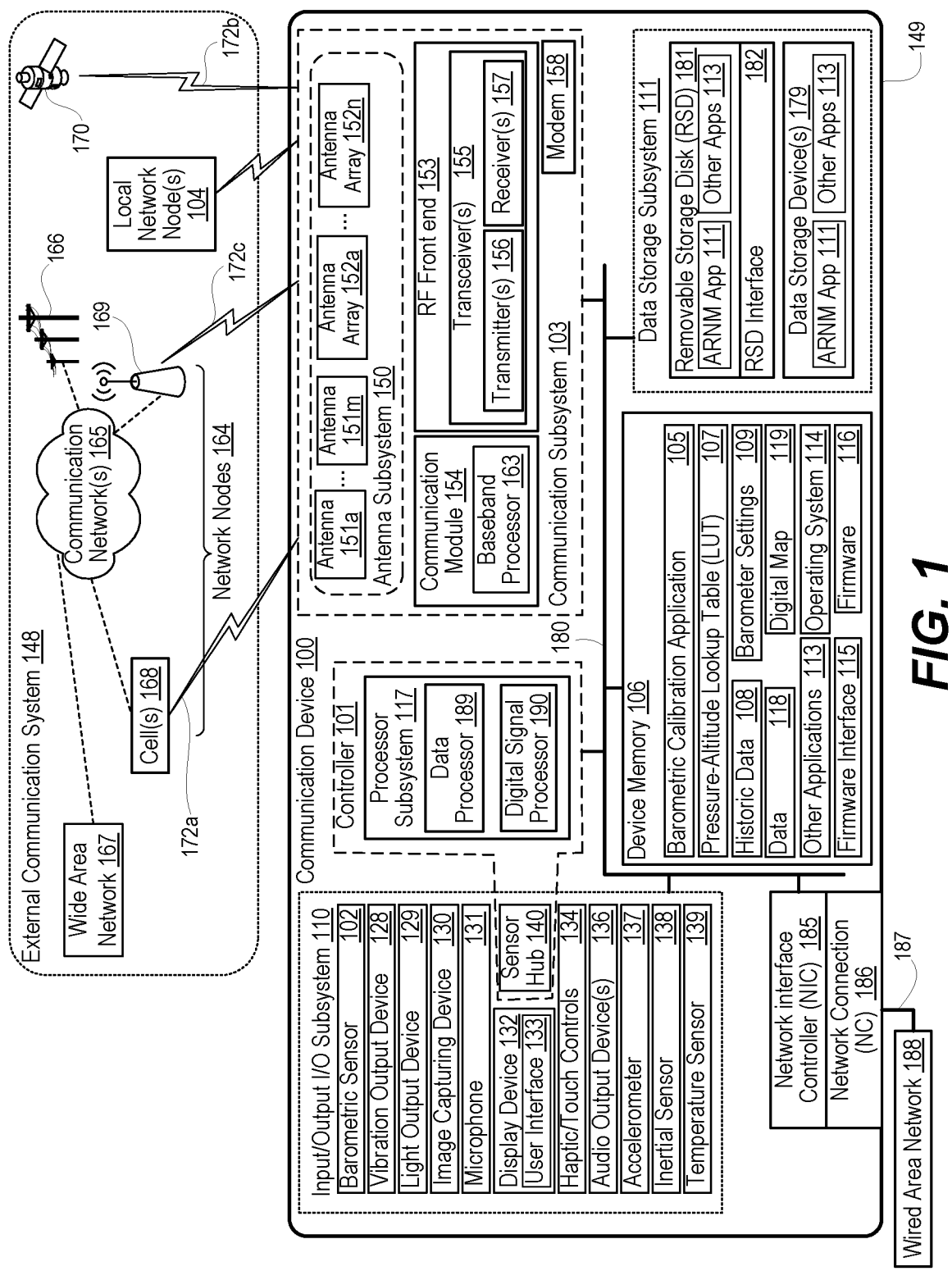
FIG. 1 depicts a functional block diagram of a communication environment including a portable communication device having components that determine whether recalibration of a barometric sensor is necessary based on a radio frequency (RF) fingerprint of known local network nodes, and within which the features of the present disclosure are advantageously implemented, according to one or more embodiments.

According to a first aspect of the present disclosure, a communication device, a computer program product, and a method avoid unnecessary recalibrating of a barometric sensor based on a radio frequency (RF) fingerprint of known local network nodes. The communication device includes a barometric sensor. The communication device includes a communication subsystem communicatively connectable over-the-air to one or more local network nodes positioned within a building to provide a local coverage area. Examples of local network nodes include wireless access points for wireless communication and femtocells or fifth generation new radio base nodes ("gNB") for cellular communication. The communication device includes a memory that stores a barometric calibration application and historical data of prior communication connections with the one or more local network nodes. A controller of the communication device is communicatively coupled to the barometric sensor, the communication subsystem, and the memory. The controller determines at least one of received signal strength and direction of respective broadcast signals from the one or more local network nodes. In response to determining that least one of the received signal strength and the direction of the respective broadcast signals, the controller determines a location of the communication device in relation to the one or more local network nodes. The controller monitors the barometric sensor for a current barometer reading. The controller determines current altitude data related to the current barometer reading of the communication device. The controller compares the current altitude data with historical altitude data associated with one or more past readings at the location of the communication device. In response to determining that a difference between the historical altitude data and the current altitude data is greater than a threshold distance, the controller calibrates the barometric sensor. In response to determining that a difference between the historical altitude data and the current altitude data is not greater than the threshold distance, the controller does not calibrate the barometric sensor, reducing power consumption by the communication device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, having controller 101 that determines whether recalibration of barometric sensor 102 is or is not necessary, in part based on an RF fingerprint, detected by communication subsystem 103, of known local network nodes 104. As used herein, an RF fingerprint is a coverage area around a selected local network node that is associated with a floor height that is constant such that each instance of being in the RF fingerprint should correspond to the same barometric pressure and altitude. Some slight barometric pressure variation is allowable due to weather and calibration drift so long as the drift is not greater than a threshold value. Communication device 100 may be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Communication device 100 is assumed to be a portable communication device whose physical location can be changed from time to time by a user.

Referring now to the specific component makeup and the associated functionality of communication device 100. Communication device 100 includes controller 101 communicatively coupled to device memory 106, communication subsystem 103, input/output (I/O) subsystem 110, and data storage subsystem 111. Device memory 106 and each subsystem (103, 110, and 111) are managed by controller 101. Device memory 106 includes program code for applications, such as barometric calibration application 105 and other application(s) 113. Device memory 106 further includes operating system (OS) 114, firmware interface 115, such as basic input/output system (BIOS) or Uniform Extensible Firmware Interface (UEFI), and firmware 116. Controller 101 executes barometric calibration application 105 that is stored in device memory 106 along with pressure-altitude lookup table (LUT) 107, historical data 108, and barometer settings 109. When executed by controller 101, barometric calibration application 105 configures communication device 100 to perform smart barometric sensor recalibration responsive to a recognized RF fingerprint of local network nodes 104. Examples of barometric sensor 102 includes a piezoelectric sensor, a piezoresistive sensor, a strain gage sensor, and a capacitive sensor.

Controller 101 includes processor subsystem 117, which executes program code to provide operating functionality of communication device 100 that avoids recalibration of barometric sensor 102 by indirectly confirming that of the barometric pressure reading is accurate. Controller 101 confirms accuracy of the calibration by determining a location, which is associated with an altitude, from communication subsystem 103. The software and/or firmware modules have varying functionality when their corresponding program code is executed by processor subsystem 117 or secondary processing devices within communication device 100. Processor subsystem 117 of controller 101 can execute program code of barometric calibration application 105 and other application(s) 113 to configure communication device 100 to perform specific functions using historical data 108, barometer settings 109, and computer data 118. In one or more embodiments, controller 101 executes barometric calibration application 105 to configure communication device 100 to: (i) determine at least one of received signal strength and direction of respective broadcast signals from one or more local network nodes 104; (ii) determine a location of communication device 100 in relation to the one or more local network nodes 104 based on the received signal strength and/or the direction of the respective broadcast signals; (iii) monitor barometric sensor 102 for a current barometer reading; (iv) determine current altitude data related to the current barometer reading; (v) store the location of the communication device with the received strength and/or direction, and the current barometric reading as historical data 108 in device memory 106 for future reference; (vi) compare the current altitude data with historical altitude data associated with one or more past readings at the location of communication device 100; and (vii) calibrate barometric sensor 102 in response to determining that a difference between the historical altitude data (108) and the current altitude data is greater than a threshold distance in barometer settings. The barometric pressures are related to altitudes, so, in one alternate embodiment, the compared data may be current and historical pressure readings. In one or more embodiments, digital map 119 is stored in device memory 106. Controller 101 tracks a series of locations of communication device 100. Controller generates and updates digital map 119 of a building including one or more floor levels and one or more locations of transitions between floor levels based on the series of locations that are tracked. Digital map 119 includes altitude data for the series of location. The altitude data may be in the form of barometric data that can be converted to altitude data. Controller 101 determines whether the difference between the historical altitude data and the current altitude data is greater than the threshold distance referenced to the altitude data stored in digital map 119.

I/O subsystem 110 includes barometric sensor 102, vibration output device 128, light output device 129, image capturing device(s) 130, microphone 131, display device 132 that presents user interface 133, touch/haptic controls 134, and audio output device(s) 136. In one or more embodiments, I/O subsystem includes additional sensors, such as accelerometer 137 that provides acceleration data, inertial sensor 138, and temperature sensor 139. In one or more embodiments, support processors such as sensor hub 140 manage activating, controlling, monitoring, and polling of certain sensors such as barometric sensor 102.

Referring now to the communication components and features of communication device 100. Communication subsystem 103 of communication device 100 enables wireless communication with external communication system 148. Communication subsystem 103 includes antenna subsystem 150 having lower band antennas 151a-151m and higher band antenna arrays 152a-152n that can be attached in/at different portions of housing 149. Communication subsystem 103 includes radio frequency (RF) front end 153 and communication module 154. RF front end 153 includes transceiver(s) 155, which includes transmitter(s) 156 and receiver(s) 157. RF front end 153 further includes modem(s) 158. RF Communication module 154 of communication subsystem 103 includes baseband processor 163 that communicates with controller 101 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 using antenna subsystem 150. The received signal is amplified and filtered by receiver(s) 157, which demodulate received encoded data from a received carrier signal.

In one or more embodiments, controller 101, via communication subsystem 103, performs multiple types of over-the-air communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks to communication device 100. The particular network nodes 164 can be cellular "cells", base stations, or base nodes 168 that support cellular OTA communication using RAT as part of a radio access network (RAN). Communication device 100 may use barometer settings 109 to determine which types of base nodes 168 have a small coverage area to use for RF fingerprinting of a location. In an example, particular types of femtocells or 5G NR base nodes 168 intended for indoor installation may be sufficiently limited in transmit power and constrained by building structure to be designated as local network nodes. Communication subsystem 103 communicates via OTA communication channel(s) 172a with base nodes 168.

Communication subsystem 103 can receive OTA communication from location services such as provided by global positioning system (GPS) satellites 170. Communication subsystem 103 receives GPS signal(s) 172b broadcast by GPS satellites 170 to obtain geospatial location information when outdoors. In some instances, the accuracy of GPS information is sufficient to serve as another indirect confirmation of calibration of the barometric sensor when outdoors. In some instances, the GPS information is not available, such as when communication device 100 is indoor or due to the inherent altitude inaccuracy of the GPS system.

In one or more embodiments, network nodes 164 can be access point(s) or access nodes 169 that support wireless OTA communication. Communication device 100 may use barometer settings 109 to determine which types of access nodes 169 have a small coverage area to use for RF fingerprinting of a location. In an example, particular types of access nodes 169 intended for indoor installation may be sufficiently limited in transmit power and constrained by building structure to be designated as local network nodes. Communication subsystem 103 communicates via wireless communication channel(s) 172c with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access.

Data storage subsystem 111 of communication device 100 includes data storage device(s) 179. Controller 101 is communicatively connected, via system interlink 180, to data storage device(s) 179. Data storage subsystem 111 provides applications, program code, and stored data on nonvolatile storage that is accessible by controller 101. For example, data storage subsystem 111 can provide a selection of applications and computer data, such as barometric calibration application 105 and other application(s) 113 that support smart recalibration of barometric sensor 102. These applications can be loaded into device memory 106 for execution by controller 101. In one or more embodiments, data storage device(s) 179 can include hard disk drives (HDDs), optical disk drives, and/or solid-state drives (SSDs), etc. Data storage subsystem 111 of communication device 100 can include removable storage device(s) (RSD(s)) 181, which is received in RSD interface 182. Controller 101 is communicatively connected to RSD 181, via system interlink 180 and RSD interface 182. In one or more embodiments, RSD 181 is a non-transitory computer program product or computer readable storage device. Controller 101 can access RSD 181 or data storage device(s) 179 to provision communication device 100 with program code, such as code for barometric calibration application 105 and other application(s) 113.

In one or more embodiments, communication device 100 includes network interface controller (NIC or "network interface") 185 with a network connection (NC) 186. Network cable 187 connects NC 186 to wired area network 188. NIC 185 can be referred to as a "network interface" that can support one or more network communication protocols. Wired area network 188 can be a local area network (LAN), a campus area network (CAN), a metropolitan area network (MAN), or a wide area network (WAN).

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 117, which includes one or more central processing units (CPUs), such as data or application processor 189. Processor subsystem 117 can include one or more digital signal processors 190 that are integrated with application processor 189. Processor subsystem 117 can include other processors that are communicatively coupled to data processor 189, such as baseband processor 163 of communication module 154 or sensor hub 140 of I/O subsystem 110. In one or embodiments that are not depicted, controller 101 can further include distributed processing and control components that are external to housing 149 or grouped with other components, such as I/O subsystem 110. Data processor 189 is communicatively coupled, via system interlink 180, to device memory 106. In one or more embodiments, controller 101 of communication device 100 is communicatively coupled via system interlink 180 to communication subsystem 103, data storage subsystem 111, and I/O subsystem 110.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

Figure 2:
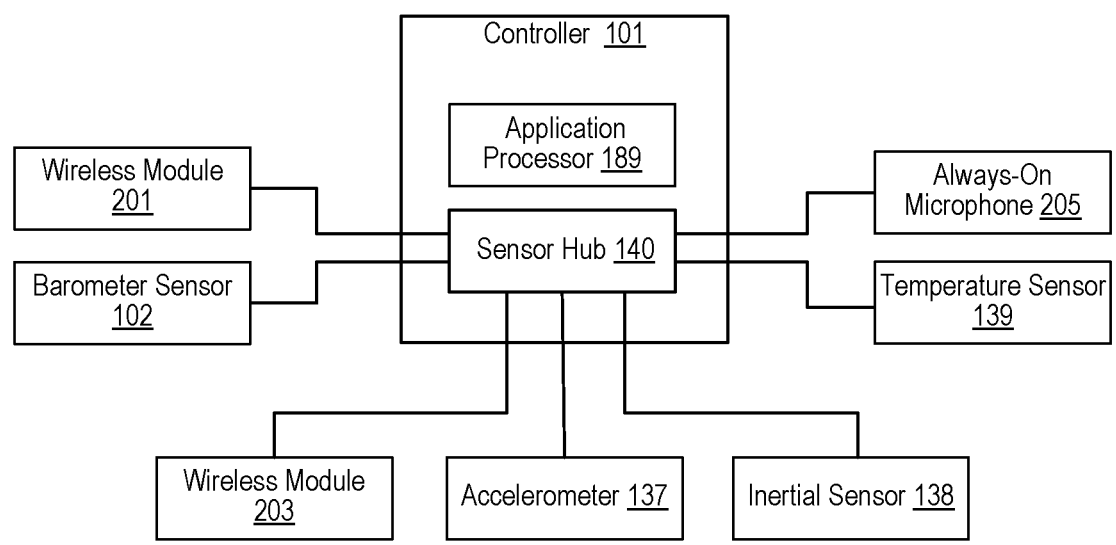
FIG. 2 depicts a simplified functional block diagram of a controller of the communication device of FIG. 1 that supports barometer recalibration while an application processor is either in an active mode or an inactive mode, according to one or more embodiments.

FIG. 2 depicts a simplified functional bock of controller 101 of communication device 100 (FIG. 1) having sensor hub 140 that has control of components necessary to determine whether barometer recalibration is necessary while application processor 189 is either in an active mode during an active communication session with a wireless access point or an inactive mode when not in an active communication session. In one or more embodiments, sensor hub 140 has a significantly lower power consumption rate than application processor 189. Sensor hub 140 activates wireless integrated circuit, chip, or module 201, which wirelessly connects to wireless access points, and wireless modem 203 to monitor signal strength and/or wireless direction of local network nodes 104. Sensor hub 140 is communicatively connected to sensors, such as barometric sensor 102, that are monitored while application processor 189 is either in an active mode or an inactive mode. Other monitored sensors may include accelerometer 137, inertial sensor 138, temperature sensor 139, and always-on voice microphone 205 for activating application processor 189. At least one of accelerometer 137 and inertial sensor 138 produce movement data used for dead reckoning of an estimated location of communication device 100.

Figure 3:
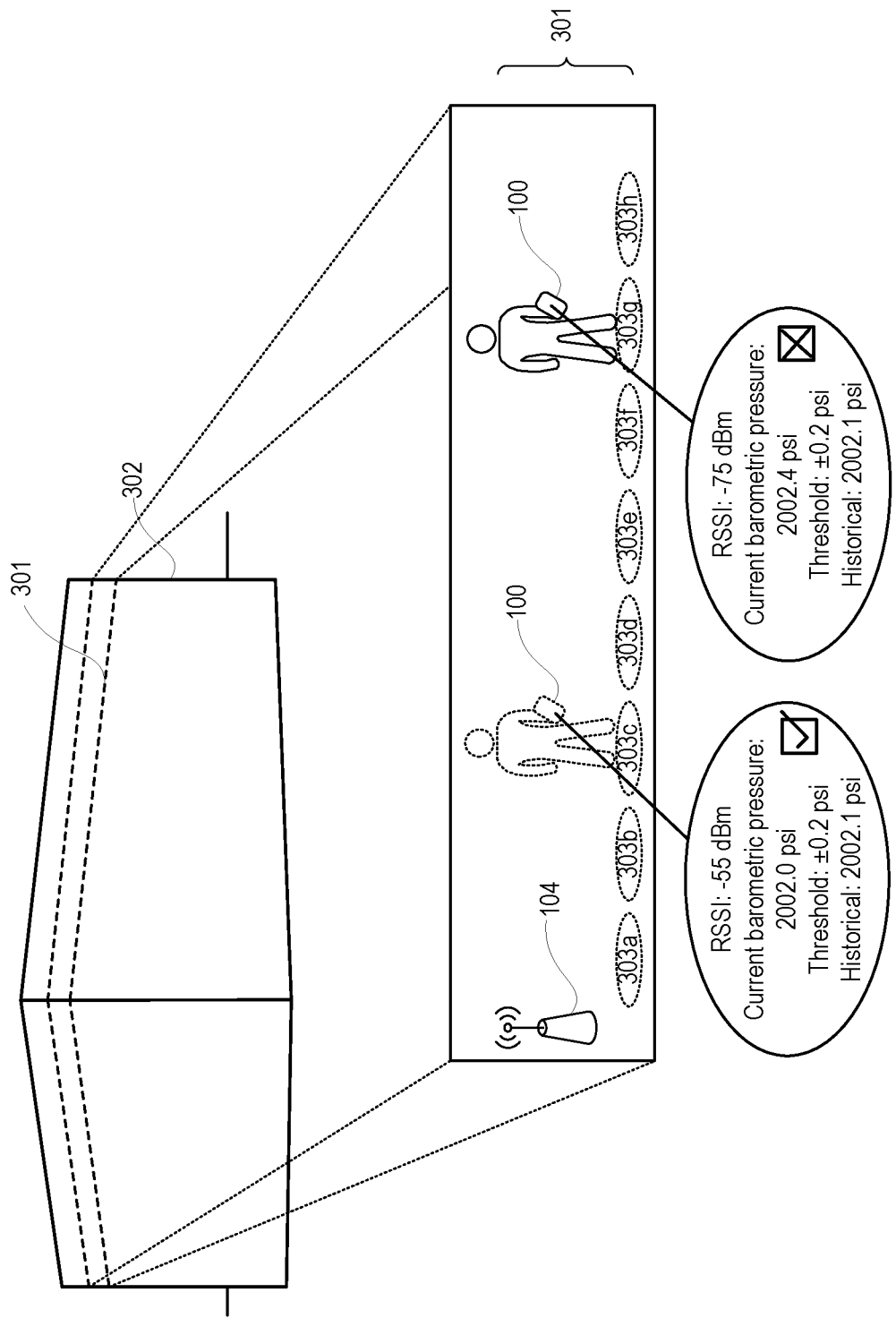
FIG. 3 depicts a diagram of a first RF fingerprint recognized for a single floor office with a single local network node, according to one or more embodiments.

FIG. 3 depicts a diagram of a first RF fingerprint recognized, within in multi-story building 302, for single 18th floor office 301 with single local network node 104. Communication device 100 has recorded historical data 108 for eight (8) locations 303a-303h in single 18th floor office 301 of multi-story building 302. Communication device 100 stores historical data 108 when barometric sensor 102 has been calibrated within a period of time that corresponds to an accurate reading. In an example, communication device 100 determines that the first RF fingerprint is limited to a single floor. Being on the same floor, all locations 303a-303h within the first RF fingerprint are expected to have the same barometric pressure reading with the same corresponding altitude. Each further location 303a-303h from local network node 104 has decreasing received signal strength indicator (RSSi) relative to a previous one of locations (303a-303h) and/or local network node 104. The decreasing RSSi is related to increasing distance from local network node 104. Sensor hub 140 receives RSSi from wireless module 201 (FIG. 2). In an example, sensor hub 140 of controller 101 (FIG. 1) receives barometric pressure reading from barometric sensor 102 (FIG. 2). Sensor hub 140 looks up or calculates a current altitude such as by referencing pressure-altitude LUT 107 (FIG. 1). Communication device 100 compares barometric pressure readings or associated altitude values for previous visits to locations 303a-303h to compare to current barometer pressure readings. In response to determining that the barometer readings are within a threshold range from historical barometer pressure readings, communication device 100 may defer triggering recalibration of barometer sensor 102 (FIG. 2). TABLE A provides examples of historical data 108 for local network node "Office AP Mac address 2F:3C:44:1A:22:AB". The barometric pressure readings are the same for each location 303a-303h because locations 303a-303h are on the same floor at the same altitude.

TABLE A

| Location | RSSi | Pressure |
| --- | --- | --- |
| Location 303a | −45 | 1002.1 |
| Location 303b | −50 | 1002.1 |
| Location 303c | −55 | 1002.1 |
| Location 303d | −60 | 1002.1 |
| Location 303e | −65 | 1002.1 |
| Location 303f | −70 | 1002.1 |
| Location 303g | −75 | 1002.1 |
| Location 303h | −80 | 1002.1 |

In an example, communication device 100 is physically at location 303c. Communication device 100 receives RSSi of −55 dBm from local network node 104 and identifies location 303c as being within the first RF fingerprint of single 18th floor office 301 of multi-story building 302. In one or more embodiments, the structure of multi-story building 302 greatly attenuates the signal of local network node 104 so that the RF fingerprint is determined based solely on the RSSi being above a lower power threshold. In one or more embodiments, communication device 100 is so frequently on 18th floor office 301 that any instance of being able to receive the RSSi on an adjacent floor results in an occasional reversion to a standard frequency of calibration of barometric sensor 102 due to a difference in barometric pressure between different floors. Communication device 100 receives current barometric pressure reading 2002.0 psi from barometric sensor 102 (FIG. 1). Communication device 100 accesses barometric pressure reading of 2001.1 psi from historical data 108 (FIG. 1) for location 303c. In response to the difference being less than the threshold value of ±0.2 psi, communication device 100 determines that barometric sensor 102 is providing a sufficiently accurate barometric pressure reading to defer calibration of barometric sensor 102.

In another example, communication device 100 is physically at location 303g. Communication device 100 receives RSSi of −75 dBm from local network node 104 and identifies location 303g as being within the first RF fingerprint of single 18th floor office 301 of multi-story building 302. Communication device 100 receives current barometric pressure reading 2002.4 psi from barometric sensor 102 (FIG. 1). Communication device 100 accesses barometric pressure reading of 2001.1 psi from historical data 108 (FIG. 1) for location 303c. In response to the difference being greater than the threshold value of ±0.2 psi, communication device 100 determines that barometric sensor 102 requires calibration.

Figure 4:
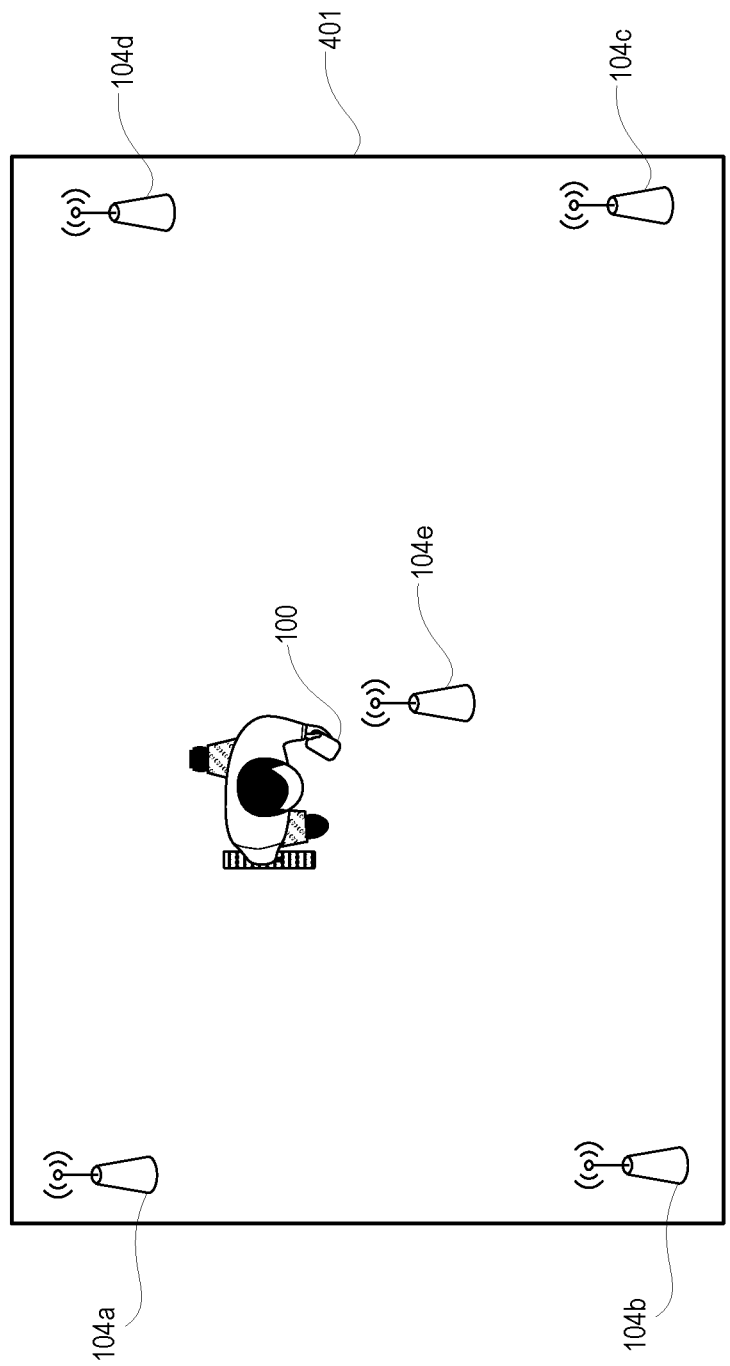
FIG. 4 depicts a top view of a large office having five (5) local network nodes positioned to provides wireless coverage, according to one or more embodiments.

FIG. 4 depicts a top view of a large office 401 having five (5) local network nodes 104a-104e positioned to provides wireless coverage. Communication device 100 may identify locations within large office 401 based on identifying the strongest one of local network nodes 104a-104e. In one or more embodiments, communication device 100 collects data from multiple local network nodes 104a-104e. The collection of data from these multiple location network nodes 104a-104e adds can increase the accuracy of the determination, using more complex methods. For example, communication device 100 can triangulate horizontal location relative to multiple local network nodes 104a-104e.

In one or more embodiments, controller 101 (FIG. 1) of communication device 100 monitors a respective direction of each of the respective broadcast signals from the one or more local network nodes 104a, 104b, 104c, 104d, and 104e. Controller 101 determines the location, including a floor level, of communication device 100 at least in part by triangulating relative positions of one of the one or more local network nodes 104a-104e measured by communication device 100 from different locations and in part based on the current altitude data.

In one or more embodiments, controller 101 (FIG. 1) of communication device 100 monitors acceleration data from accelerometer 137. Controller 101 (FIG. 1) determines a change in location by performing dead reckoning in response to the acceleration data. Controller 101 (FIG. 1) monitors a direction of the respective broadcast signal from a particular one of one or more local network nodes 104a-104e. Controller 101 (FIG. 1) determines the location, including a floor level, at least in part based on triangulating relative positions of the particular one of one or more local network nodes 104a-104e and in part based on the current altitude data.

Figure 5:
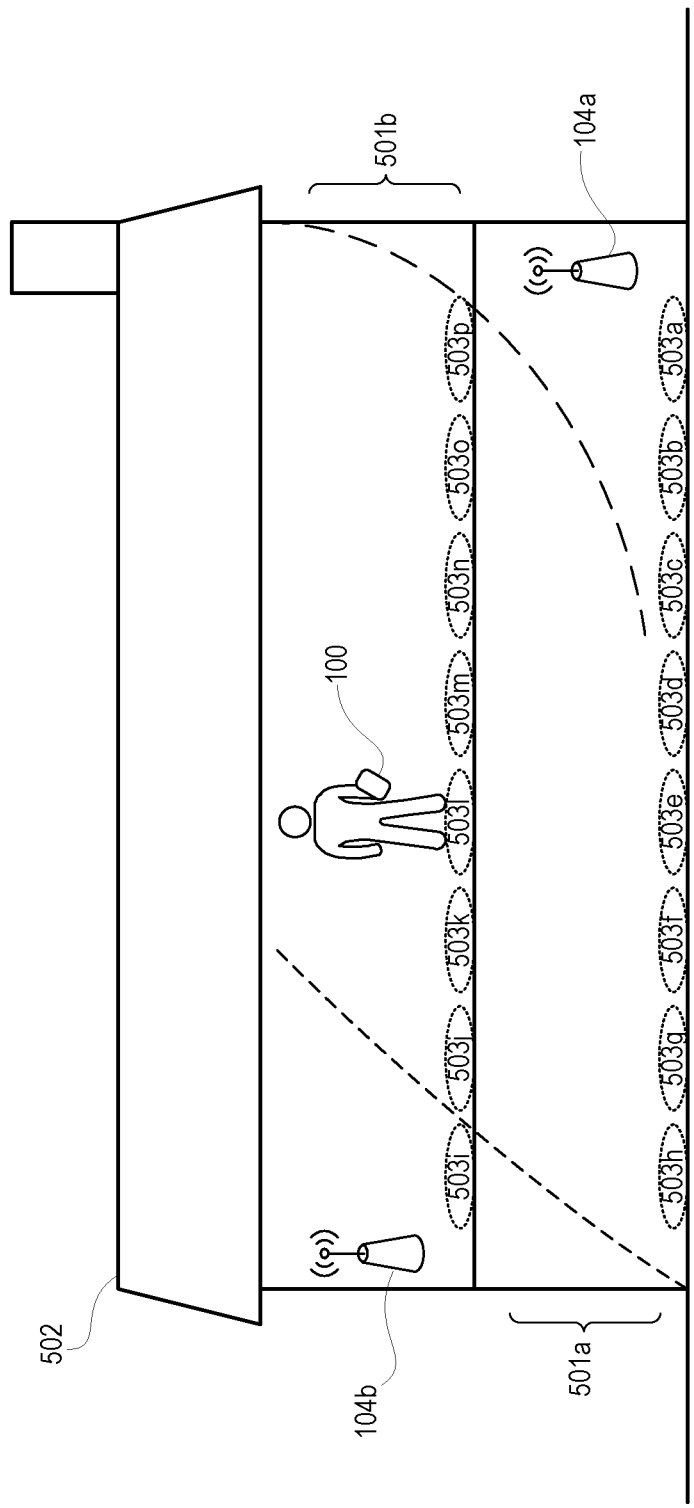
FIG. 5 depicts a diagram of a second RF fingerprint recognized for a two floor home with two corresponding local network nodes, according to one or more embodiments.

FIG. 5 depicts a diagram of a second RF fingerprint recognized for first floor 501a and second floor 501b of home 502. Local network nodes 104a-104b are positioned respectively on first and second floor 501a, 501b. In an example, communication device 100 may determine location as one of locations 503a-503h on the first floor and locations 503i-503p on the second floor based solely on RSSi from the stronger of the two local network nodes 104a-104b. In another example, communication device 100 may determine location based on RSSi from both of local network nodes 104a-104b. In an additional example, communication device 100 may determine location in part by determining triangulating directions to both local network nodes 104a-104b from communication device 100 at a selected location in home 502. In further example, communication device 100 may determine location in part by determining triangulating directions to one local network node 104a-104b while communication device 100 is moving within home 502. TABLE B presents examples of historical data 108 for local network node "Home AP Mac Address 00:22:6B:FF:24:12" on the first floor 501a:

TABLE B

| Location | RSSi | Pressure |
| --- | --- | --- |
| Location 503a | −55 | 999.6 |
| Location 503b | −50 | 999.6 |
| Location 503c | −55 | 999.6 |
| Location 503d | −60 | 999.6 |
| Location 503e | −65 | 999.6 |
| Location 503f | −70 | 999.6 |
| Location 503g | −75 | 999.6 |
| Location 503h | −80 | 999.6 |

TABLE C presents example historical data 108 for local network node "Home AP Mac address 00:08:5c:00:00:01" on second floor 501b:

TABLE C

| Location | RSSi | Pressure |
| --- | --- | --- |
| Location 503i | −55 | 999.1 |
| Location 503j | −50 | 999.1 |
| Location 503k | −55 | 999.1 |
| Location 503l | −60 | 999.1 |
| Location 503m | −65 | 999.1 |
| Location 503n | −70 | 999.1 |

TABLE C-continued

| Location | RSSi | Pressure |
| --- | --- | --- |
| Location 503o | −75 | 999.1 |
| Location 503p | −80 | 999.1 |

In one or more embodiments, sufficient RF signal attention between first floor 501*a* and second floor 501*b* of home 502 allows communication device 100 to determine location with only one of TABLES B-C having RSSi above a lower received power threshold to be applicable. In one or more embodiments, communication device 100 receives signals from both local network nodes 104*a*-104*b* at least in some locations. Communication device 100 can determine that certain locations can be conclusively determined based on a much higher RSSi from one than another of local network nodes 104*a*-104*b*. Other locations may not be distinguishable based solely on RSSi. In one or more embodiments, communication device 100 determines a relative direction and distance between communication device 100 and each local network nodes 104*a*-104*b*. In an example, communication device 100 determines each location based on a geometric solution for the determined directions to local network nodes 104*a*-104*b*. In some instances, communication device 100 can identify a direction in the horizontal plane but not distinguish the vertical direction to one of local network nodes 104*a*-104*b*, which can result in some locations being ambiguous as to which floor 501*a*-501*b* is indicated. In other instances, communication device 100 can triangulate not only horizontal location but also vertical location relative to multiple local network nodes 104*a*-104*b* so that some locations are not ambiguous as to which floor 501*a*-501*b* is indicated. Alternatively, communication device 100 may learn attenuation of signals caused by structures of home 502, which creates combinations of RSSi readings from local network nodes 104*a*-104*b* that are not ambiguous, enabling identification of which floor 501*a*-501*b* communication device 100 is on. In an example, communication device 100 detects a series of RSSi readings that is compared to and matched with RSSi readings stored in digital map 119.

Figure 6A:
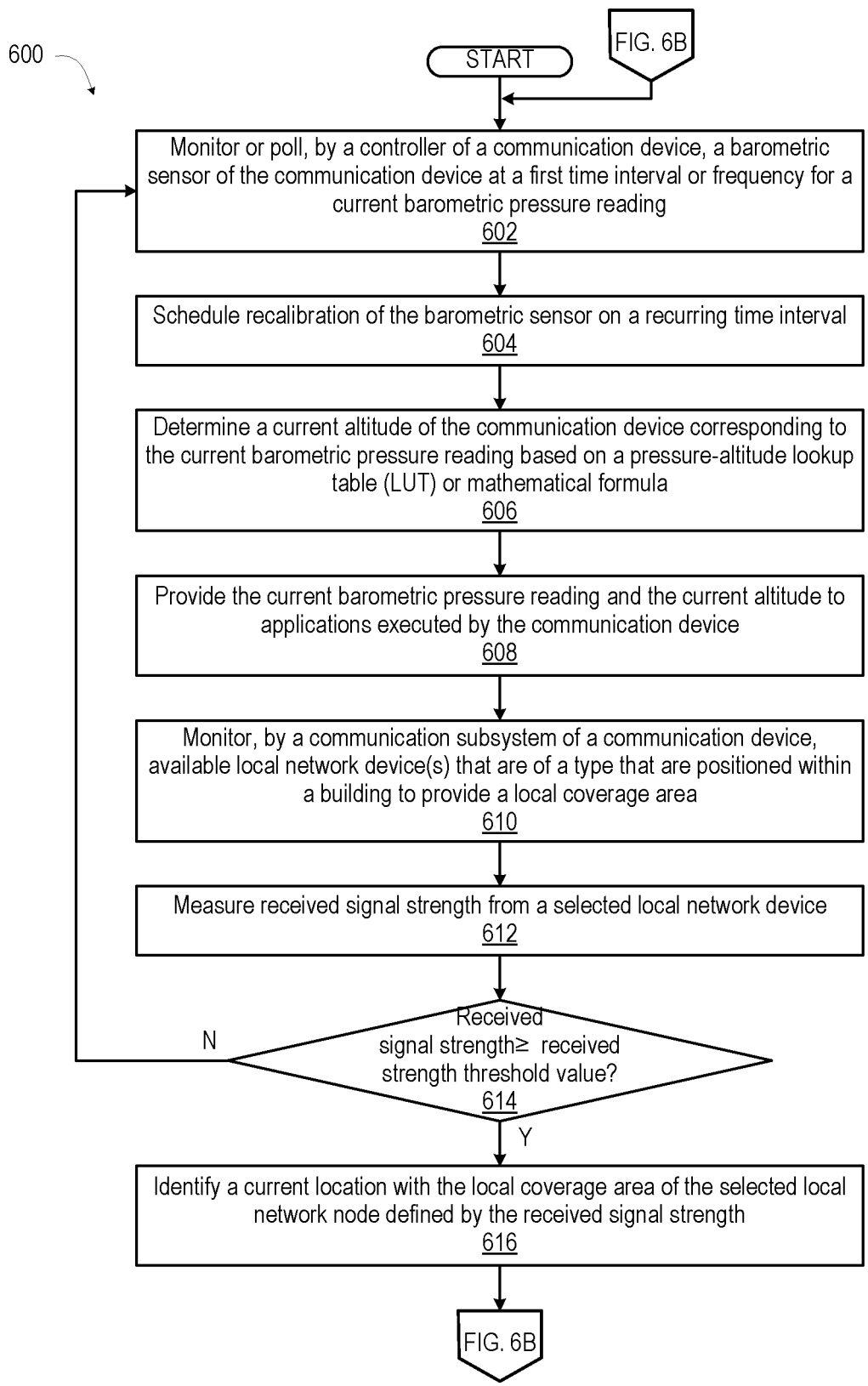
FIGS. 6A-6B (collectively FIG. 6) presents a flow diagram of a method performed by a communication device for smart barometric sensor recalibration, responsive to a recognized RF fingerprint, according to one or more embodiments.
Figure 6B:
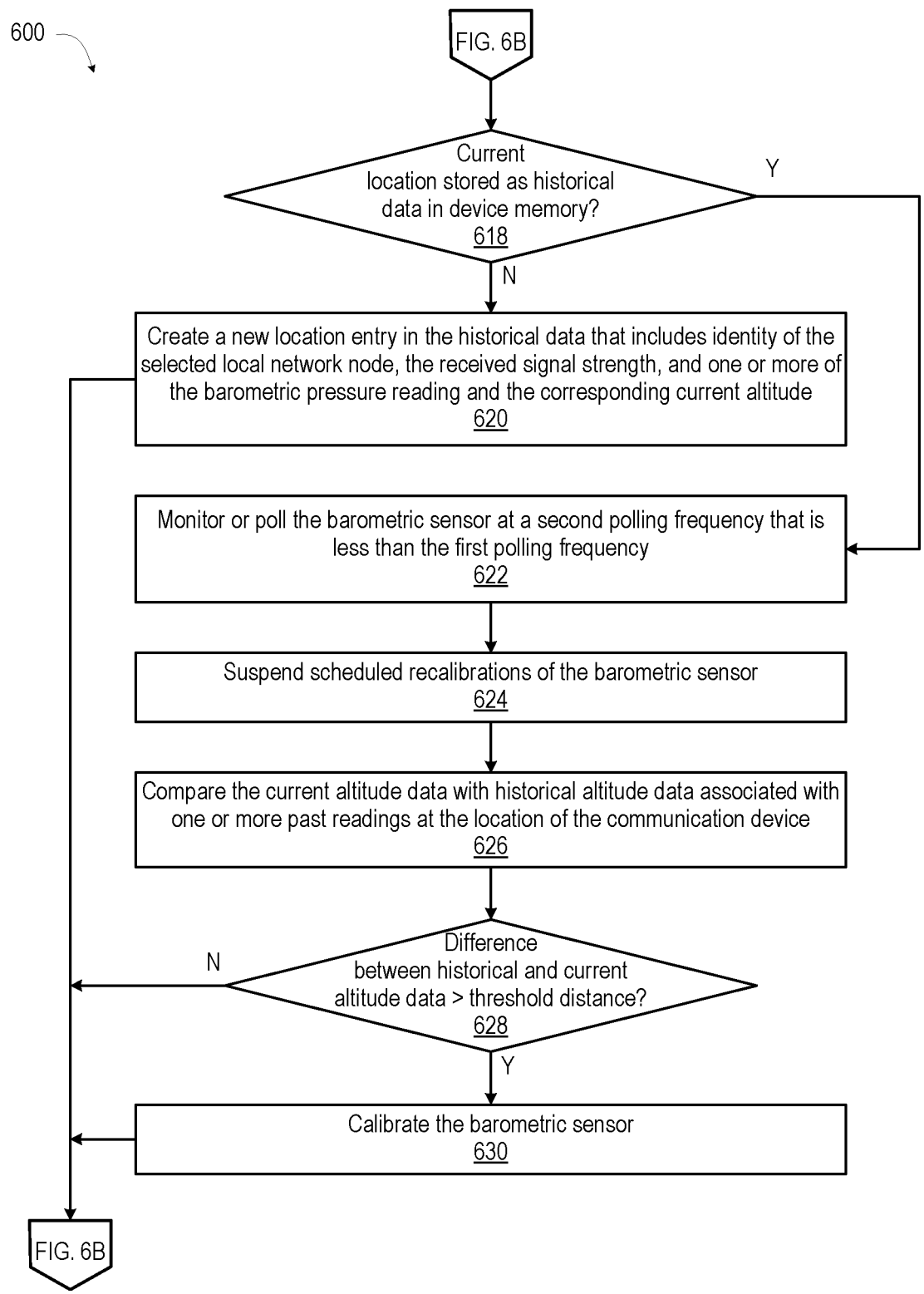
Figure 7:
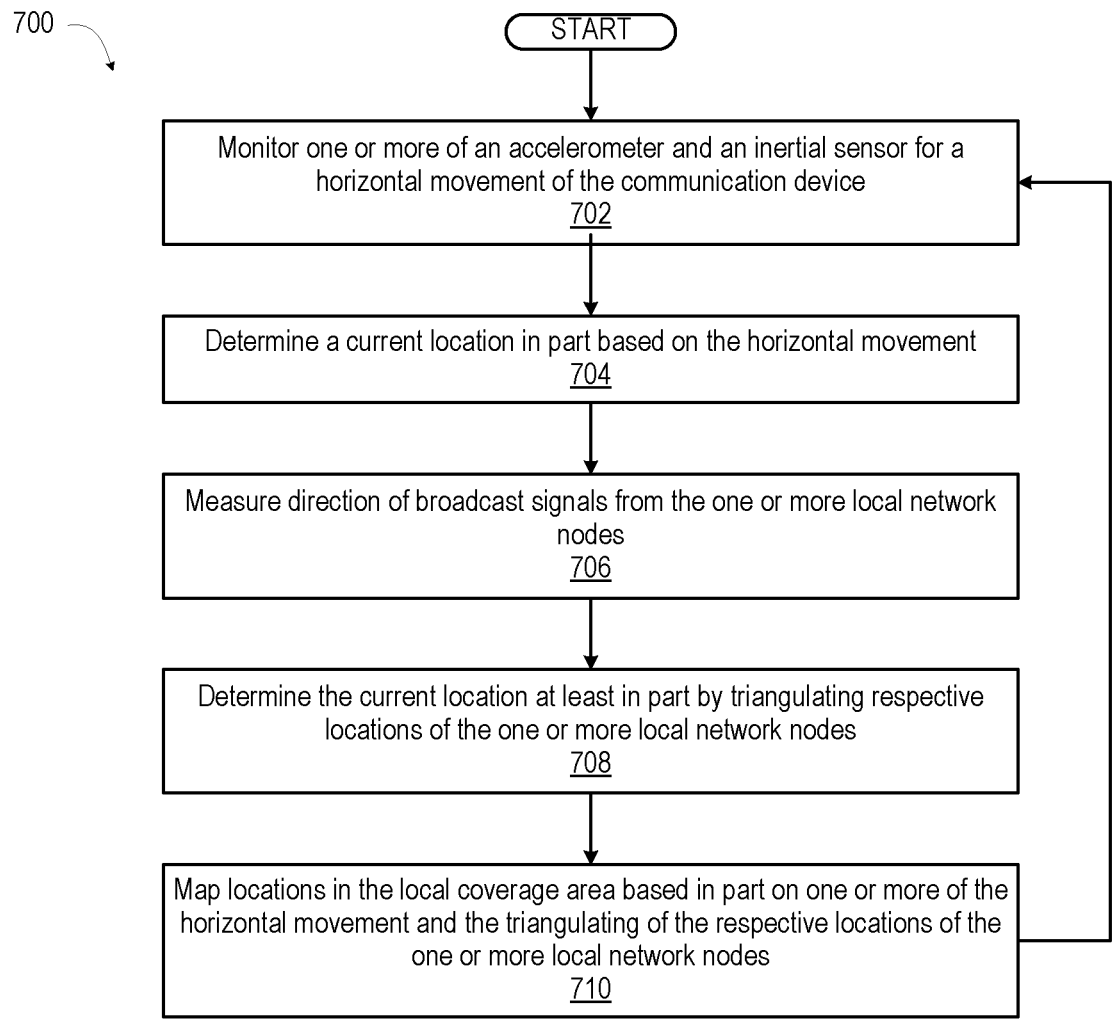
FIG. 7 presents a flow diagram performed by the communication device to determine horizontal or geospatial coordinates for each location by referencing an accelerometer or an inertial sensor and triangulating directions to the local network nodes (s), according to one or more embodiments.

FIG. 6A-6B (collectively FIG. 6) present a flow diagram of method 600 performed by example communication device 100 for smart barometric sensor recalibration responsive to a recognized RF fingerprint of local network nodes. FIG. 7 presents a flow diagram performed by the communication device to determine horizontal or geospatial coordinates for each location by referencing an accelerometer or an inertial sensor and triangulating directions to the local network nodes (s). The description of methods 600 and 700 are provided with general reference to the specific components illustrated within the preceding FIGS. 1-5, and specific components referenced in methods 600 and 700 may be identical or similar to components of the same name used in describing preceding FIGS. 1-5. In an example, controller 101 of communication device 100 (FIG. 2) performs methods 600 and 700 implementing functionality of smart barometric sensor recalibration.

With reference to FIG. 6A, method 600 begins with monitoring or polling, by a controller of a communication device, a barometric sensor of the communication device for a current barometric pressure reading (block 602). The monitoring and/or polling occurs at a first time interval or frequency. In one or more embodiments, the controller includes a sensor hub that activates, configures, manages, and polls sensors, such as monitoring acceleration data from the accelerometer and monitoring a current barometer reading of the barometric sensor. The sensor hub consumes stored electrical power at a sufficiently low level than the application processor to enable continuous activation, enabling for example periodic barometric pressure readings. The sensor hub is communicatively coupled to an application processor of the controller that executes applications. The application processor consumes power at a higher level. In one or more embodiments, application processor switches to an inactive state when not required to execute an application, reducing power consumption. Sensor hub is configured to be able to monitor the local network nodes, via use of a wireless chip or module and a wireless modem, when the application processor is inactive or asleep, which may be referred to as in a sleep mode.

Method 600 includes scheduling recalibration of the barometric sensor on a recurring time interval (block 604). In one or more embodiments, routine recalibration of the barometric sensor is triggered by one or more factors including: the amount of usage of the barometric sensor, an elapse of time, and changes in the environment such as temperature. Method 600 includes determining a current altitude of the communication device corresponding to the current barometric pressure reading (block 606). The determining of the current altitude can be based on a pressure-altitude lookup table (LUT) or a mathematical formula. Method 600 includes providing the current barometric pressure reading and the current altitude to applications, such as emergency communication applications to first responders or local weather applications, executed by the communication device (block 608). In an example, the communication device reports the current altitude data to a connected network node, such as by including corresponding meta data with a voice call. Method 600 includes monitoring, by a communication subsystem of a communication device, available local network node(s) that are positioned within a building to provide a local coverage area (block 610). Method 600 includes measuring received signal strength from a selected local network node (block 612). Method 600 includes determining whether the received signal strength is equal to or greater than a received strength threshold value indicating that the communication device is in the local coverage area of the selected local network node (decision block 614). In response to determining that the received signal strength is less than the received strength threshold value, method 600 returns to block 602. In response to determining that the received signal strength is equal to or greater than the received strength threshold value, method 600 includes identifying a current location of the communication device with the local coverage area of the selected local network node defined by the received signal strength (block 616). Then method 600 proceeds to block 618 (FIG. 6B).

With reference to FIG. 6B, method 600 includes determining whether the current location has been previously stored as historical data in device memory (decision block 618). In response to determining that the current location has not been previously stored in historical data, method 600 includes creating a new location entry in the historical data that includes the identity of the selected local network node, the received signal strength, and one or more of the barometric pressure reading and the corresponding current altitude (block 620). Then method 600 returns to block 602 (FIG. 6A). In response to determining that the current location has been previously stored in historical data, method 600 includes monitoring or polling the barometric sensor at a second polling frequency that is less than the first polling frequency (block 622). The first polling frequency is empirically preset based on calibration drift based on one or more of time, usage, and ambient condition changes. The second polling frequency is longer because being in the RF fingerprint defined by the historical data provides an alternate way to confirm that calibration of the barometric sensor has not drifted too much for accurate readings. Method 600 includes suspending scheduled recalibrations of the barometric sensor (block 624). Method 600 includes comparing the current altitude data with historical altitude data associated with one or more past readings at the location of the communication device (block 626). Method 600 includes determining whether a difference between the historical altitude data and the current altitude data is greater than a threshold distance (decision block 628). In response to determining that the difference between the historical altitude data and the current altitude data is greater than the threshold distance, method 600 includes calibrating the barometric sensor (block 630). Then method 600 returns to block 602 (FIG. 6A). In response to determining that the difference between the historical altitude data and the current altitude data is less than or equal to the threshold distance, method 600 returns to block 602 (FIG. 6A).

With reference to FIG. 7, method 700 includes monitoring one or more of an accelerometer and an inertial sensor for a horizontal movement of the communication device (block 702). Method 700 includes determining a current location in part based on the horizontal movement (block 704). Method 700 includes measuring direction of broadcast signals from the one or more local network nodes (block 706). Method 700 includes determining the current location at least in part by triangulating respective locations of the one or more local network nodes (block 708). Method 700 includes mapping locations in the local coverage area based in part on one or more of the horizontal movement and the triangulating of the respective locations of the one or more local network nodes (block 710). Method 700 returns to block 702.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
a barometric sensor;
a communication subsystem communicatively connectable to one or more local network nodes positioned within a building to provide a local coverage area;
a memory that stores a barometric calibration application and historical data of communication connections with the one or more local network nodes; and
a controller communicatively coupled to the barometric sensor, the communication subsystem, and the memory and which:
determines at least one of received signal strength and direction of respective broadcast signals from the one or more local network nodes;
determines a location of the communication device in relation to the one or more local network nodes in response to determining the at least one of the received signal strength and the direction of the respective broadcast signals;
in response to determining that the location of the communication device is within a coverage area of the one or more local network nodes, polls the barometric sensor at a second polling frequency that is less than a first polling frequency used when the communication device is not within the coverage area;
monitors the barometric sensor for a current barometer reading;
determines current altitude data related to the current barometer reading of the communication device;

compares the current altitude data with historical altitude data associated with one or more past readings at the location of the communication device; and in response to determining that a difference between the historical altitude data and the current altitude data is greater than a threshold distance, calibrates the barometric sensor.

2. The communication device of claim 1, wherein the controller:

in response to determining that the location of the communication device is not within a coverage area of the one or more local network nodes, polls the barometric sensor at the first polling frequency, the first polling frequency being empirically preset based on calibration drift based on one or more of time, usage, and ambient condition changes.

3. The communication device of claim 1, wherein:

the communication subsystem comprises a wireless integrated circuit that wirelessly connects to wireless access points of the one or more local network nodes;

the communication device comprises an application processor that operates in one of an active mode during an active communication session with one of the wireless access points and a sleep mode when not in the active communication session; and the controller comprises a sensor hub communicatively connected to the application processor, and which polls the barometric sensor and determines the location of the communication device both when the application processor is in active mode and in sleep mode.

4. The communication device of claim 1, wherein the controller:

monitors a respective direction of each of the respective broadcast signals from the one or more local network nodes; and determines the location including a floor level of the communication device at least in part by triangulating relative positions of one of the one or more local network nodes measured by the communication device from different locations and in part based on the current altitude data.

5. The communication device of claim 1, further comprising an accelerometer, wherein the controller:

monitors acceleration data from the accelerometer;

determines a change in location by performing dead reckoning in response to the acceleration data;

monitors respective direction of the respective broadcast signal from a particular one of the one or more local network nodes; and determines the location including a floor level at least in part based on triangulating relative positions of the particular one of the one or more local network nodes and in part based on the current altitude data.

6. The communication device of claim 5, wherein the controller:

tracks a series of locations of the communication device;

generates a digital map of a building including one or more floor levels and one or more locations of transitions between floor levels based on the series of locations that are tracked; and determines whether the difference between the historical altitude data and the current altitude data is greater than the threshold distance referenced to the digital map.

7. The communication device of claim 1, wherein the controller:

in response to determining that a difference between the historical altitude data and the current altitude is less than or equal to the threshold distance, reports the current altitude data to a connected network node of the one or more local network nodes.

8. The communication device of claim 1, wherein the barometric sensor comprises one of a piezoelectric sensor, a piezoresistive sensor, a strain gage sensor, and a capacitive sensor.

9. A method comprising:

determining, by a controller of a communication device, at least one of received signal strength and direction of respective broadcast signals from one or more local network nodes positioned within a building to provide a local coverage area;

determining a location of the communication device in relation to the one or more local network nodes in response to determining the at least one of the received signal strength and the direction of the respective broadcast signals;

monitoring a barometric sensor of the communication device for a current barometer reading;

in response to determining that the location of the communication device is within a coverage area of the one or more local network nodes, polling the barometric sensor at a second polling frequency that is less than a first polling frequency used when the communication device is not within the coverage area;

determining current altitude data related to the current barometer reading of the communication device;

comparing the current altitude data with historical altitude data associated with one or more past readings at the location of the communication device; and in response to determining that a difference between the historical altitude data and the current altitude data is greater than a threshold distance, calibrating the barometric sensor.

10. The method of claim 9, further comprising:

in response to determining that the location of the communication device is not within a coverage area of the one or more local network nodes, polling the barometric sensor at the first polling frequency, which is empirically preset based on calibration drift based on one or more of time, usage, and ambient condition changes.

11. The method of claim 9, wherein the controller comprises a sensor hub communicatively connected to an application processor that operates in one of an active mode during an active communication session with one of wireless access points of the one or more local network nodes and a sleep mode when not in the active communication session, the method further comprising:

wirelessly connecting to wireless access points of the one or more local network nodes; and polling the barometric sensor and determining the location of the communication device by the sensor hub both when the application processor is in active mode and in sleep mode.

12. The method of claim 9, further comprising:

monitoring a respective direction of each of the respective broadcast signals from the one or more local network nodes; and determining the location including a floor level of the communication device at least in part by triangulating relative positions of one of the one or more local network nodes measured by the communication device from different locations and in part based on the current altitude data.

13. The method of claim 9, further comprising:
monitoring acceleration data from an accelerometer of the communication device;
determining a change in location by performing dead reckoning in response to the acceleration data;
monitoring respective direction of the respective broadcast signal from a particular one of the at least one local network nodes; and
determining the location including a floor level at least in part based on triangulating relative positions of the particular one of the one or more local network nodes and in part based on the current altitude data.

14. The method of claim 13, further comprising:
tracking a series of locations of the communication device;
generating a digital map of a building including one or more floor levels and one or more locations of transitions between floor levels based on the series of locations that are tracked; and
determining whether the difference between the historical altitude data and the current altitude data is greater than the threshold distance referenced to the digital map.

15. The method of claim 9, further comprising:
in response to determining that a difference between the historical altitude data and the current altitude is less than or equal to the threshold distance, reporting the current altitude data to a connected network node of the one or more local network nodes.

16. A computer program product comprising:
a non-transitory computer readable storage device; and
program code on the non-transitory computer readable storage device that when executed by a processor associated with a communication device, the program code enables the communication device to provide functionality of:
determining, by a controller of the communication device, at least one of received signal strength and direction of respective broadcast signals from one or more local network nodes positioned within a building to provide a local coverage area;
determining a location of the communication device in relation to the one or more local network nodes in response to determining the at least one of the received signal strength and the direction of the respective broadcast signals;
monitoring a barometric sensor of the communication device for a current barometer reading;
in response to determining that the location of the communication device is within a coverage area of the one or more local network nodes, polling the barometric sensor at a second polling frequency that is less than a first polling frequency used when the communication device is not within the coverage area;
determining current altitude data related to the current barometer reading of the communication device;
comparing the current altitude data with historical altitude data associated with one or more past readings at the location of the communication device; and
in response to determining that a difference between the historical altitude data and the current altitude data is greater than a threshold distance, calibrating the barometric sensor.

17. The computer program product of claim 16, wherein the program code enables the communication device to provide the functionality of:
in response to determining that the location of the communication device is not within a coverage area of the one or more local network nodes, polling the barometric sensor at the first polling frequency, which is empirically preset based on calibration drift based on one or more of time, usage, and ambient condition changes.

18. The computer program product of claim 16, wherein:
the controller of the communication device comprises a sensor hub communicatively connected to an application processor that operates in one of an active mode during an active communication session with one of wireless access points of the one or more local network nodes and a sleep mode when not in the active communication session; and
the program code enables the communication device to provide the functionality of:
wirelessly connecting to wireless access points of the one or more local network nodes; and
polling the barometric sensor and determining the location of the communication device by the sensor hub both when the application processor is in active mode and in sleep mode.

19. The computer program product of claim 16, wherein the program code enables the communication device to provide the functionality of:
monitoring a respective direction of each of the respective broadcast signals from the one or more local network nodes; and
determining the location including a floor level of the communication device at least in part by triangulating relative positions of one of the one or more local network nodes measured by the communication device from different locations and in part based on the current altitude data.

20. The computer program product of claim 16, wherein the program code enables the communication device to provide the functionality of:
monitoring acceleration data from an accelerometer of the communication device;
determining a change in location by performing dead reckoning in response to the acceleration data;
monitoring respective direction of the respective broadcast signal from a particular one of the at least one local network nodes; and
determining the location including a floor level at least in part based on triangulating relative positions of the particular one of the one or more local network nodes and in part based on the current altitude data.

* * * * *